(12) United States Patent
Graham et al.

(10) Patent No.: US 9,449,754 B2
(45) Date of Patent: Sep. 20, 2016

(54) COIL CONSTRUCTIONS FOR IMPROVED INDUCTIVE ENERGY TRANSFER

(71) Applicant: Apple Inc., Cupertino, CA (US)

(72) Inventors: Christopher S. Graham, Cupertino, CA (US); Eric S. Jol, Cupertino, CA (US); Makiko K. Brzezinski, Cupertino, CA (US); Paul J. Thompson, Cupertino, CA (US); Stephen E. Yao, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/291,024

(22) Filed: May 30, 2014

(65) Prior Publication Data

US 2015/0348697 A1 Dec. 3, 2015

(51) Int. Cl.
*H01F 27/28* (2006.01)
*H01F 27/29* (2006.01)
(Continued)

(52) U.S. Cl.
CPC ...... *H01F 27/2823* (2013.01); *H01F 27/2828* (2013.01); *H01F 38/14* (2013.01); *H01F 41/04* (2013.01); *H01F 41/064* (2016.01); *H01F 41/086* (2016.01); *H01F 41/10* (2013.01); *Y10T 29/49021* (2015.01)

(58) Field of Classification Search
CPC .............. H01F 27/28; H01F 27/2823; H01F 27/2871; H01F 41/04; H01F 27/2828; H01F 41/086; H01F 41/10; H01F 41/064; H01F 38/14; Y10T 29/49021
USPC ........... 336/189, 222, 192, 190, 225, 83, 90; 29/602.1
See application file for complete search history.

(56) References Cited

U.S. PATENT DOCUMENTS 2,471,869 A * 5/1949 Gebel ........................ 336/192
3,504,276 A * 3/1970 Beaver ............... G01N 27/9033
324/260

(Continued)

FOREIGN PATENT DOCUMENTS

CN 101523693 9/2009
CN 101867203 10/2010

(Continued)

OTHER PUBLICATIONS

Author Unknown, "System Description Wireless Power Transfer," vol. 1: Lower Power, Part 1: Interface Definition, Version 1.1.2, 186 pages, Jun. 2013.

(Continued)

*Primary Examiner* — Mangtin Lian
(74) *Attorney, Agent, or Firm* — Brownstein Hyatt Farber Schreck, LLP

(57) ABSTRACT

An inductor coil for an inductive energy transfer system includes multiple layers of a single wire having windings that are interlaced within at least two of the multiple layers such that both an input end and an output end of the wire enter and exit the coil on a same side of the coil. The input end and the output end of the wire may abut one another at the location where the input and output wires enter and exit the inductor coil. The wire can include one or more bundles of strands and the strands in each bundle are twisted around an axis extending along a length of the wire, and when there are at least two bundles, the bundles may be twisted around the axis. At least one edge of the inductor coil can be formed into a variety of shapes, such as in a curved shape.

20 Claims, 8 Drawing Sheets

(51) Int. Cl.
    *H01F 27/02*     (2006.01)
    *H01F 41/04*     (2006.01)
    *H01F 38/14*     (2006.01)
    *H01F 41/10*     (2006.01)

(56) References Cited

U.S. PATENT DOCUMENTS

| | | | |
|---|---|---|---|
| 3,676,814 A * | 7/1972 | Trunzo et al. | 336/205 |
| 4,496,927 A * | 1/1985 | Inoue | 336/208 |
| 4,529,906 A | 7/1985 | McMahon | |
| 4,994,015 A * | 2/1991 | Cadwell | A61N 2/02 335/299 |
| 5,903,134 A | 5/1999 | Takeuchi et al. | |
| 6,798,039 B1 | 9/2004 | Gillespie et al. | |
| 6,798,326 B2 | 9/2004 | Iida | |
| 6,803,744 B1 | 10/2004 | Sabo | |
| 6,922,128 B2 | 7/2005 | Vilander et al. | |
| 7,164,255 B2 | 1/2007 | Hui | |
| 7,432,793 B2 | 10/2008 | Nussbaum | |
| 7,839,120 B2 | 11/2010 | Elizalde Rodarte | |
| 7,902,953 B1 | 3/2011 | Watt | |
| 8,049,370 B2 | 11/2011 | Azancot et al. | |
| 8,159,183 B2 | 4/2012 | Choi et al. | |
| 8,169,185 B2 | 5/2012 | Partovi et al. | |
| 8,354,821 B2 | 1/2013 | Cheng et al. | |
| 8,373,388 B2 | 2/2013 | Kim et al. | |
| 8,456,038 B2 | 6/2013 | Azancot et al. | |
| 8,587,154 B2 | 11/2013 | Fells et al. | |
| 8,692,639 B2 | 4/2014 | Baarman et al. | |
| 8,766,488 B2 | 7/2014 | Azancot et al. | |
| 8,823,238 B2 | 9/2014 | Greaves et al. | |
| 9,166,440 B2 | 10/2015 | Ben-Shalom et al. | |
| 9,178,369 B2 | 11/2015 | Partovi | |
| 9,209,627 B2 | 12/2015 | Baarman et al. | |
| 9,231,411 B2 | 1/2016 | Baarman et al. | |
| 9,356,473 B2 | 5/2016 | Ghovanloo | |
| 2009/0179725 A1 * | 7/2009 | Asano | 336/222 |
| 2013/0049484 A1 | 2/2013 | Weissentern et al. | |
| 2014/0091756 A1 | 4/2014 | Ofstein et al. | |
| 2015/0280442 A1 | 10/2015 | Graham | |
| 2015/0303699 A1 | 10/2015 | Wagman et al. | |
| 2016/0006288 A1 | 1/2016 | Wagman et al. | |

FOREIGN PATENT DOCUMENTS

| | | |
|---|---|---|
| CN | 101971453 | 2/2011 |
| EP | 0642203 | 7/1994 |
| EP | 0886363 | 12/1998 |
| EP | 2161811 | 3/2010 |
| EP | 2397973 | 12/2011 |
| EP | 2674950 | 6/2012 |
| WO | WO 92/17929 | 10/1992 |
| WO | WO 98/23020 | 5/1998 |
| WO | WO 03/096361 | 11/2003 |
| WO | WO 2004/073283 | 8/2004 |
| WO | WO 2005/036569 | 4/2005 |
| WO | WO 2010/129369 | 11/2010 |

OTHER PUBLICATIONS

Palany, "Power Losses in Litz Wire Used in IPT Applications," Department of Electrical and Computer Engineering, University of Auckland, Aukland, New Zealand, 9 pages, at least as early as May 30, 2014.

Invitation to Pay Additional Fees, PCT/US2015/032826, 6 pages, Nov. 5, 2015.

* cited by examiner

COIL CONSTRUCTIONS FOR IMPROVED INDUCTIVE ENERGY TRANSFER

TECHNICAL FIELD

The present invention relates generally to inductive energy transfer, and more particularly to coil constructions for improved inductive energy transfer in an inductive energy transfer system.

BACKGROUND

Many electronic devices include one or more rechargeable batteries that require external power to recharge from time to time. Often, these devices may be charged using a similar power cord or connector, for example a universal serial bus ("USB") connector. However, despite having common connection types, devices often require separate power supplies with different power outputs. These multiple power supplies can be burdensome to use, store, and transport from place to place. As a result, the benefits of device portability may be substantially limited.

Furthermore, charging cords may be unsafe to use in certain circumstances. For example, a driver of a vehicle may become distracted attempting to plug an electronic device into a vehicle charger. In another example, a charging cord may present a tripping hazard if left unattended.

To account for these and other shortcomings of portable electronic devices, some devices include an inductive charging device. The user may simply place the electronic device on an inductive charging surface of a charging device in order to transfer energy from the charging device to the electronic device. The charging device transfers energy to the electronic device through inductively coupling between a transmitter coil in the charging device and a receiver coil in the electronic device. Under some circumstances, however, losses in the transmitter and receiver coils reduce the efficiency of the energy transfer. As one example, losses can be produced by the resistance of the wire or wires in the coils.

SUMMARY

Embodiments described herein provide wire and coil constructions that can reduce losses in the transmitter and receiver coils. In one aspect, an inductor coil in a portable electronic device includes three or more layers of a single wire. The windings of the coil are interlaced within at least two of the three or more layers such that both an input end and an output end of the wire enter and exit the coil on a same side of the coil. The portable electronic device may be a transmitter device or a receiver device. The input end and the output end of the wire can abut one another at the location where the input and output ends enter and exit the coil. A shape of at least one edge of the inductor coil may complement a surface of the electronic device.

In another aspect, the wire in the inductor coil can be constructed with two or more bundles of strands that are twisted around an axis that extends along the length of the wire. Each bundle can include multiple individual conductive strands that may also be twisted around the axis that extends along the length of the wire. As one example, a bundle can include seven individual conductive strands that are twisted around the axis that extends along the length of the wire. The wire may include four bundles are twisted around the axis.

In yet another aspect, a method for forming an inductor coil can include forming the inductor coil on a mandrel by winding the wire on or around the mandrel. The inductor coil is formed into a first inductor coil structure. Typically, a bonding agent or adhesive is disposed on the windings to fix or secure the inductor coil structure. The bonding agent may then be treated to cause the bonding agent to become malleable. In some embodiments, the bonding agent can be heated to produce a pliable bonding agent. The inductor coil is then formed into a second inductor coil structure by forming the inductor coil onto a mold or surface. For example, an inductor coil can be constructed in a rectangular shape. The bonding agent in the coil can be heated and the inductor coil pressed on a curved surface to produce a trapezoid shape. At least one edge or surface of the coil, the edge in contact with the curved surface, will be formed into a shape that complements the curved surface.

BRIEF DESCRIPTION OF THE DRAWINGS

Embodiments of the invention are better understood with reference to the following drawings. The elements of the drawings are not necessarily to scale relative to each other. Identical reference numerals have been used, where possible, to designate identical features that are common to the figures.

DETAILED DESCRIPTION

Embodiments described herein provide an inductive energy transfer system that transfers energy inductively from a transmitter device to a receiver device to charge a battery or to operate the receiver device. Additionally or alternatively, communication or control signals can be transmitted inductively between the transmitter and receiver devices. For example, while charging, high frequency pulses can be added on top of the inductive charging frequency to enable both charging and communication. Alternatively, the transferred energy can be used solely for communication. Thus, the terms "energy", "power", or "signal(s)" are meant to encompass transferring energy for wireless charging, transferring energy as communication and/or control signals, or both wireless charging and the transmission of communication and/or control signals.

Figure 1:
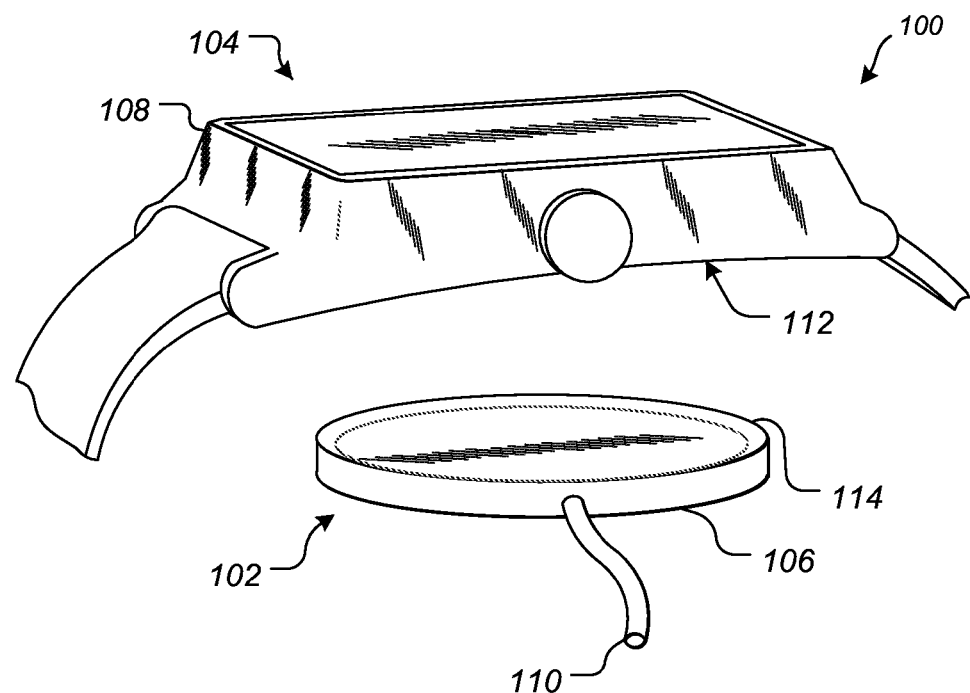
FIGS. 1 and 2 are perspective views of one example of an inductive energy transfer system.

Referring now to FIG. 1, there is shown a perspective view of one example of an inductive energy transfer system in an unmated configuration. The illustrated embodiment shows a transmitter device 102 that is configured to wirelessly pass energy to a receiver device 104. The receiver device 104 can be any electronic device that includes one or more inductors, such as a portable electronic device or wearable accessory.

The wearable accessory, such as depicted in FIG. 1, may be configured to provide health-related information or data such as but not limited heart rate data, blood pressure data, temperature data, oxygen level data, diet/nutrition information, medical reminders, health-related tips or information, or other health-related data. The associated monitoring device may be, for example, a tablet computing device, phone, personal digital assistant, computer, and so on.

A wearable accessory may include a coupling mechanism to connect a strap or band useful for securing to a user. For example, a smart watch may include a band or strap to secure to a user's wrist. In another example, a wearable health assistant may include a strap to connect around a user's chest, or alternately, a wearable health assistant may be adapted for use with a lanyard or necklace. In still further examples, a wearable device may secure to or within another part of a user's body. In these and other embodiments, the strap, band, lanyard, or other securing mechanism may include one or more electronic components or sensors in wireless or wired communication with the accessory. For example, the band secured to a smart watch may include one or more sensors, an auxiliary battery, a camera, or any other suitable electronic component.

In many examples, a wearable accessory, such as depicted in FIG. 1, may include a processor coupled with or in communication with a memory, one or more communication interfaces, output devices such as displays and speakers, one or more sensors, such as biometric and imaging sensors, and one or more input devices such as buttons, dials, microphones, or touch-based interfaces. The communication interface(s) can provide electronic communications between the communications device and any external communication network, device or platform, such as but not limited to wireless interfaces, Bluetooth interfaces, Near Field Communication interfaces, infrared interfaces, USB interfaces, Wi-Fi interfaces, TCP/IP interfaces, network communications interfaces, or any conventional communication interfaces. The wearable device may provide information regarding time, health, statuses or externally connected or communicating devices and/or software executing on such devices, messages, video, operating commands, and so forth (and may receive any of the foregoing from an external device), in addition to communications.

Figure 2:
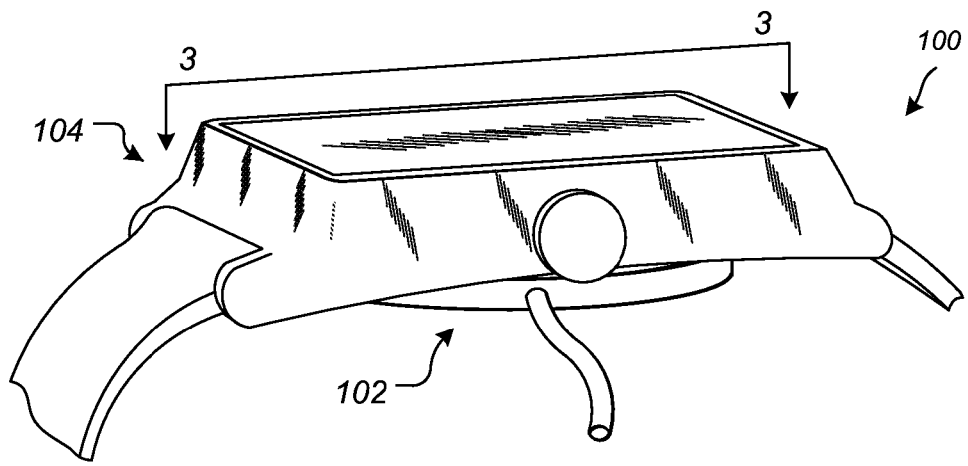

Although the system 100 illustrated in FIGS. 1 and 2 depicts a wristwatch or smart watch, any electronic device may be suitable to receive energy inductively from a transmitter device. For example, a suitable electronic device may be any portable or semi-portable electronic device that may receive energy inductively ("receiver device"), and a suitable dock device may be any portable or semi-portable docking station or charging device that may transmit energy inductively ("transmitter device").

The transmitter device 102 and the receiver device 104 may each respectively include a housing 106, 108 to enclose electronic, mechanical and structural components therein. In many examples, and as depicted, the receiver device 104 may have a larger lateral cross section than that of the transmitter device 102, although such a configuration is not required. In other examples, the transmitter device 102 may have a larger lateral cross section than that of the receiver device 104. In still further examples, the cross sections may be substantially the same. And in other embodiments, the transmitter device can be adapted to be inserted into a charging port in the receiver device.

In the illustrated embodiment, the transmitter device 102 may be connected to a power source by cord or connector 110. For example, the transmitter device 102 can receive power from a wall outlet, or from another electronic device through a connector, such as a USB connector. Additionally or alternatively, the transmitter device 102 may be battery operated. Similarly, although the illustrated embodiment is shown with the connector 110 coupled to the housing of the transmitter device 102, the connector 110 may be connected by any suitable means. For example, the connector 110 may be removable and may include a connector that is sized to fit within an aperture or receptacle opened within the housing 106 of the transmitter device 102.

The receiver device 104 may include a first interface surface 112 that may interface with, align or otherwise contact a second interface surface 114 of the transmitter device 102. In this manner, the receiver device 104 and the transmitter device 102 may be positionable with respect to each other. In certain embodiments, the second interface surface 114 of the transmitter device 102 may be configured in a particular shape that mates with a complementary shape of the receiver device 104 (see FIG. 2). The illustrative second interface surface 114 may include a concave shape that follows a selected curve. The first interface surface 112 of the receiver device 104 may include a convex shape following the same or substantially similar curve as the second interface surface 114.

In other embodiments, the first and second interface surfaces 112, 114 can have any given shape and dimension. For example, the first and second interface surfaces 112, 114 may be substantially flat. Additionally or alternatively, the transmitter and receiver devices 102, 104 can be positioned with respect to each other using one or more alignment mechanisms. As one example, one or more magnetic devices may be included in the transmitter and/or receiver devices 102 and used to align the transmitter and receiver devices. In another example, one or more actuators in the transmitter and/or receiver devices 102 can be used to align the transmitter and receiver devices. And in yet another example, alignment features, such as protrusions and corresponding indentations in the housings of the transmitter and receiver devices, may be used to align the transmitter and receiver devices. The design or configuration of the interface surfaces, one or more alignment mechanisms, and one or more alignment features can be used individually or in various combinations thereof.

Figure 3:
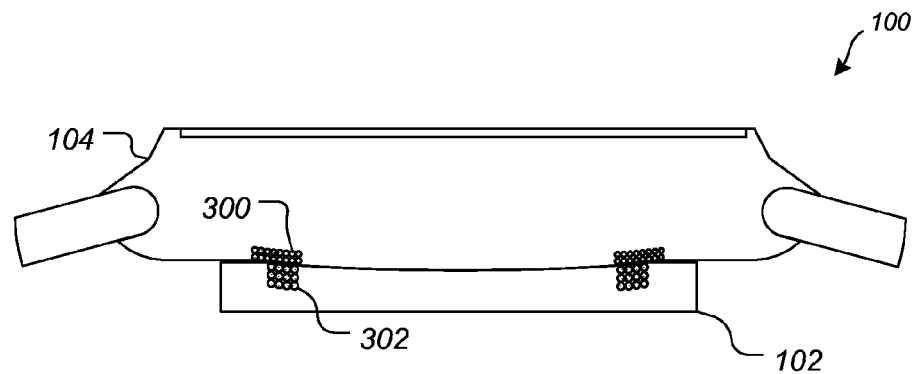
FIG. 3 depicts a cross-sectional view of the inductive energy transfer system taken along line 3-3 in FIG. 2.

FIG. 3 depicts a side cross-sectional view of the inductive energy transfer system taken along line 3-3 in FIG. 2. As discussed earlier, both the transmitter device 102 and the receiver device 104 can include electronic, mechanical, and/or structural components. For example, the receiver device 104 can include one or more processing devices, memory, a display, one or more input/output devices such as buttons, microphone, and/or speaker(s), a communication interface for wired and/or wireless communication, and a touch input device (which may or may not be incorporated into the display). The illustrated embodiment of FIG. 3 omits the electronic, mechanical, and/or structural components for simplicity and clarity.

FIG. 3 shows the example inductive energy transfer system in a mated and aligned configuration. The receiver device 104 includes one or more receiver coils having one or more windings. The receiver coil 300 may receive energy from the transmitter device 102 and may use the received energy to perform or coordinate one or more functions of the receiver device 104, and/or to replenish the charge of a battery (not shown) within the receiver device 104. In the illustrated embodiment, the receiver coil 300 includes sixteen windings arranged in two layers or rows. The receiver coil 300 can have a different number of windings arranged in one or more layers in other embodiments.

Similarly, the transmitter device 102 includes one or more transmitter coils having one or more windings. The transmitter coil 302 may transmit energy to the receiver device 104. In the illustrated embodiment, the transmitter coil 302 includes twelve windings arranged in three layers. In other embodiments, the transmitter coil 300 can have a different number of windings arranged in one or more layers.

Figure 13:
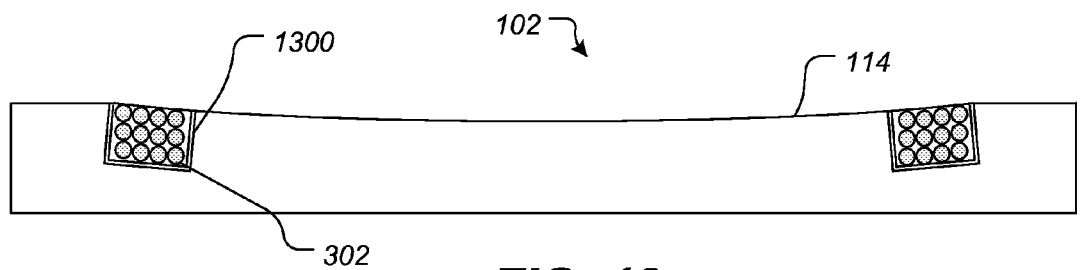
FIG. 13 is an expanded view of the transmitter device 102 shown in FIGS. 1 and 2.

The transmitter and receiver coils can be implemented with any suitable type of inductor. Each coil can have any desired shape and dimensions. The transmitter and receiver coils can have the same number of windings or a different number of windings. Typically, the transmitter and receiver coils are surrounded by an enclosure to direct the magnetic flux in a desired direction (e.g., toward the other coil). The enclosures are omitted in FIG. 3 for simplicity. An example enclosure is shown in FIG. 13.

Figure 4:
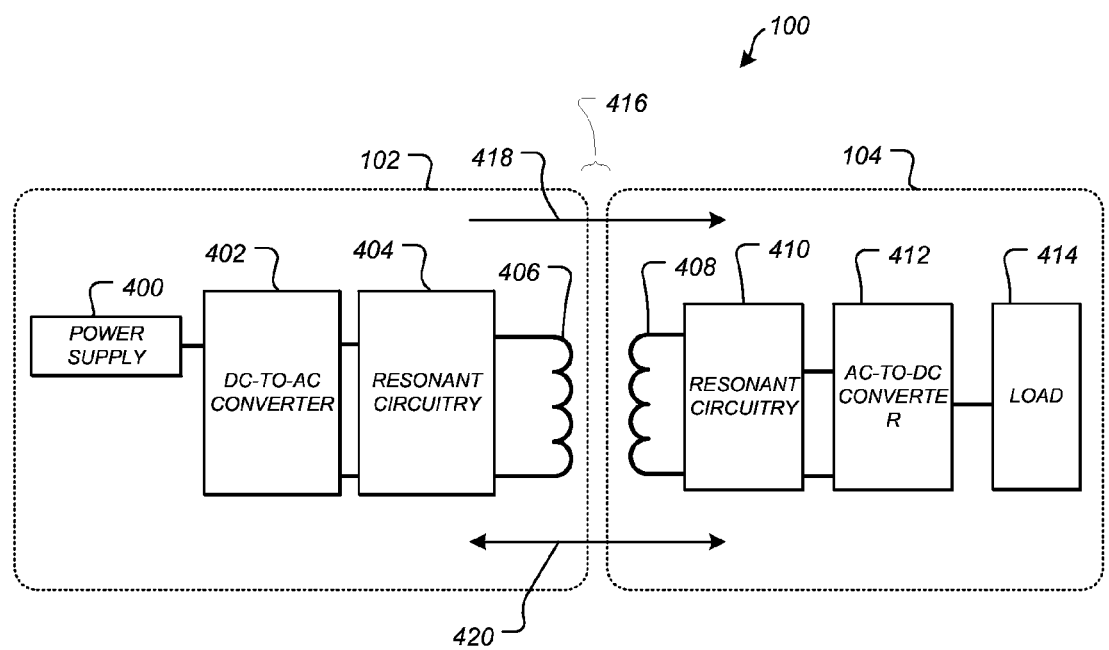
FIG. 4 depicts a simplified block diagram of one example of the inductive charging system 100 shown in FIGS. 1 and 2.

Referring now to FIG. 4, there is shown a simplified block diagram of one example of the inductive energy transfer system 100 shown in FIGS. 1 and 2. The transmitter device 102 includes a power supply 400 operably connected to a DC-to-AC converter 402. Any suitable type of a DC-to-AC converter may be used. For example, the DC-to-AC converter can be constructed as an H bridge in one embodiment. The DC-to-AC converter 402 is operatively connected to transmitter resonant circuitry 404. The transmitter resonant circuitry 404 is operatively connected to a transmitter coil 406. The DC-to-AC converter 402 converts a DC signal received from the power supply 400 into an AC signal, and the AC signal flows into and through the transmitter coil 406.

The receiver device 104 can include a receiver coil 408 operably connected to receiver resonant circuitry 410. The receiver resonant circuitry 410 is operatively connected to an AC-to-DC converter 412. Any suitable type of AC-to-DC converter may be used. For example, the AC-to-DC converter can be constructed as a diode bridge in one embodiment. A load 414 is operably connected to the output of the AC-to-DC converter 412. The load 414 is a rechargeable battery in one embodiment. A different type of load can be used in other embodiments.

The transmitter coil 406 and the receiver coil 408 together form a transformer 416. The transformer 416 transfers power or energy through inductive coupling between the transmitter coil 406 and the receiver coil 408 (energy transfer represented by arrow 418). Essentially, energy is transferred from the transmitter coil 406 to the receiver coil 408 through the creation of a varying magnetic flux by the AC signal in the transmitter coil 406 that induces a current in the receiver coil 408. The AC signal induced in the receiver coil 408 is received by the AC-to-DC converter 412 that converts the AC signal into a DC signal. In embodiments where the load 414 is a rechargeable battery, the DC signal is used to charge the battery. Additionally or alternatively, the transferred energy can be used to transmit communication signals to or from the receiver device (communication signals represented by arrow 420).

Generally, the transmitter and receiver resonant circuitry 404, 410 may be included in the inductive charging system 100 to cancel some or all of the leakage inductance when the capacitance and inductance values are near the resonant frequency. Any suitable type of resonant circuitry can be used. In some embodiments, the transmitter resonant circuitry 404 is a resonant capacitor connected in series between the DC-to-AC converter 402 and the transmitter coil 406, and the receiver resonant circuitry 410 is a resonant capacitor connected in series between the receiver coil 408 and the AC-to-DC converter 412.

The efficiency of energy transfer in a transformer is affected by a variety of factors, including the inductance and the resistance of both the transmitter and receiver coils. Typically, the distribution or current density of an AC current in a conductive wire is largest near the surface of the wire. The current density decreases as the depth into the conductive wire increases. This phenomenon is known as the skin effect. At higher frequencies, the skin effect causes the effective resistance of the wire to increase, which results in increased resistive losses in the winding(s) of the inductor (e.g., the transmitter coil).

The proximity effect also adversely affects the efficiency of energy transfer in a transformer. When an AC signal flows through a conductive wire, it creates an associated alternating magnetic field around it. The alternating magnetic field induces eddy currents in an adjacent wire, altering the overall distribution of the current flowing through the two wires. The result is that the current is concentrated in the areas of the wire furthest away from the adjacent wire carrying current in the same direction. This is known as the proximity effect. The proximity effect can significantly increase the AC resistance of adjacent wires. Additionally, the proximity effect increases with frequency.

Figure 5:
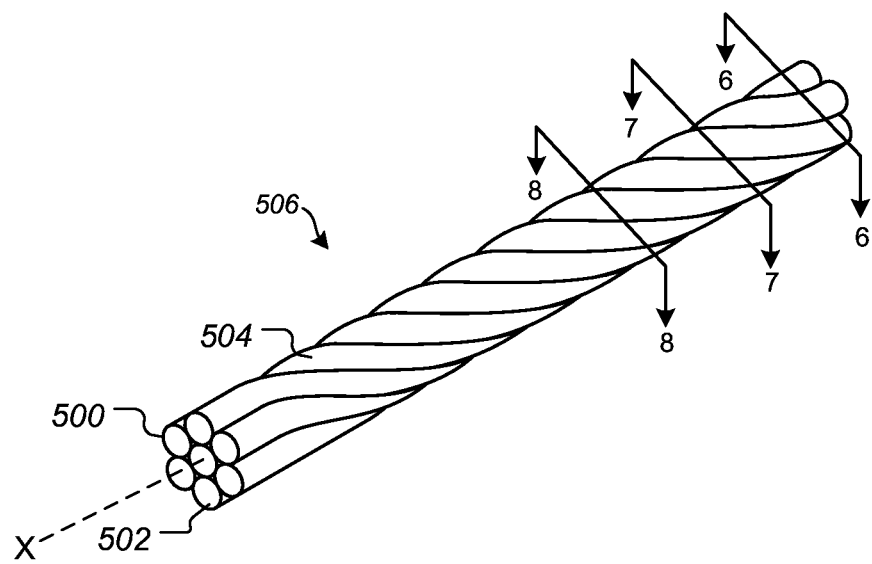
FIG. 5 is a perspective view of a bundle suitable for use in the transmitter coil 406 and/or the receiver coil 408 shown in FIG. 4.

To reduce the losses that result from the skin effect and proximity effect in conductive wires, individual strands of wires may be twisted, woven, or braided together. One example of such a strand construction is shown in FIG. 5. Individual conductive strands 500 are rotated or twisted around an axis x. The axis x extends along the length of the wire and, in the illustrated embodiment, is associated with the strand in the middle position in the middle row. Each conductive strand 500 typically includes a conductive wire strand 502 having an insulation layer 504 around it. The twisted individual strands collectively form a bundle 506.

In the illustrated embodiment, the bundle 506 includes seven conductive strands. Other embodiments can include a different number of conductive strands. For example, a bundle can include thirteen or nineteen strands.

Figure 6:
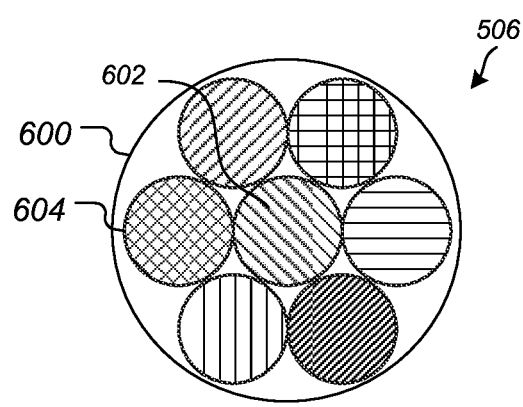
FIG. 6 is cross-sectional view of the bundle 506 taken along line 6-6 in FIG. 5.
Figure 7:
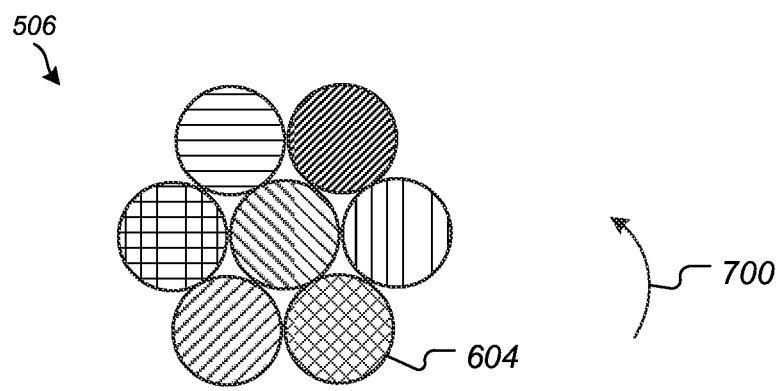
FIG. 7 is cross-sectional view of the bundle 506 taken along line 7-7 in FIG. 5.
Figure 8:
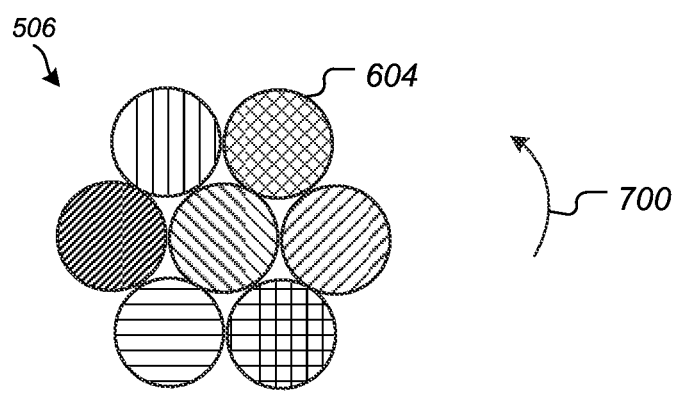
FIG. 8 is cross-sectional view of the bundle 506 taken along line 8-8 in FIG. 5.

FIGS. 6-8 are cross-sectional views of the bundle 506 illustrating the twisting of the individual strands. Each strand is shown with a different cross-hatch pattern for identification purposes only. FIG. 6 depicts an outer insulation 600 around the bundle of individual strands. The outer insulation 600 is optional and is therefore not shown in FIGS. 7 and 8.

Comparing FIG. 6 with FIGS. 7 and 8, the individual strands are rotated or twisted in a counterclockwise direction (represented by arrow 700) with respect to strand 602. Other embodiments can twist the strands in a clockwise direction.

Twisting the individual strands in the bundle 506 causes the individual strands around strand 602 to occupy different positions in the bundle for a given distance. If each strand has comparable impedance, current is distributed equally among every strand within the bundle, which reduces or eliminates the impact of the skin effect and the proximity effect.

To illustrate the different positions of the strands, the strands around strand 602 can occupy an upper left position, a middle left position, a lower left position, a lower right position, a middle left position, and an upper left position within the bundle. Looking at a particular strand 604 in the bundle, strand 604 is located in the middle left position of the bundle in FIG. 6. In FIG. 7, strand 604 is twisted to the lower right position in the bundle. And in FIG. 8, strand 604 is twisted to the upper right position in the bundle. Thus, all of the strands around strand 602 occupy various positions in the bundle over the length of the bundle.

Figure 9:
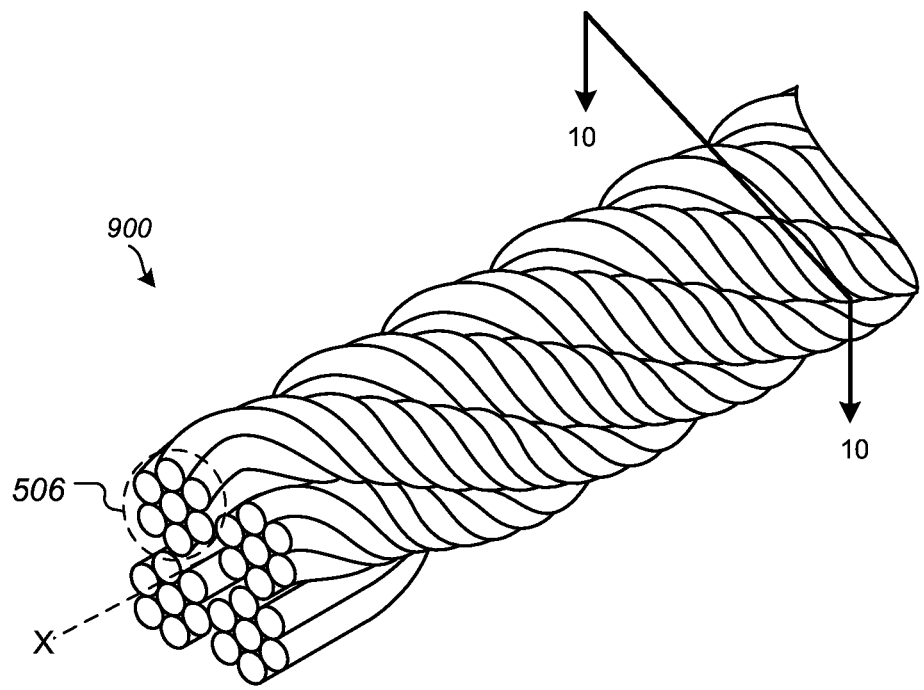
FIG. 9 is a perspective view of one example of a wire suitable for use in the transmitter coil 406 and/or the receiver coil 408 shown in FIG. 4.

FIG. 9 is a perspective view of one example of a wire suitable for use in the transmitter coil 406 and/or the receiver coil 408 shown in FIG. 4. The wire 900 is constructed by twisting multiple bundles around an axis x. In the illustrated embodiment, four bundles 506 are twisted around the axis x. Twisting the bundles 506 causes most of the strands in each bundle to be on the outside of the wire 900 for a distance and on the inside of the wire 900 for a distance. This can further reduce the impact of the skin and proximity effects on the efficiency of energy transfer.

As described earlier, the wire 900 includes four bundles in the illustrated embodiment. Other embodiments can include a different number of bundles. For example, a wire can include two, three, or six bundles.

Figure 10:
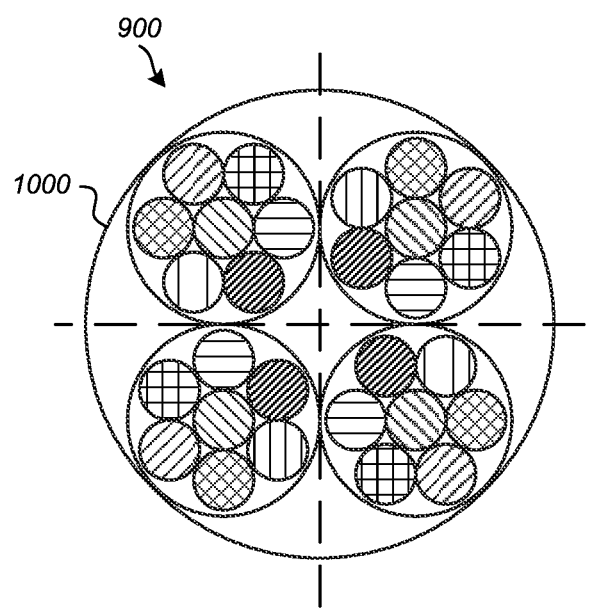
FIG. 10 is a cross-sectional view of the wire 900 taken along line 10-10 in FIG. 9.

FIG. 10 is a cross-sectional view of the wire 900 taken along line 10-10 in FIG. 9. An optional outer insulation layer 1000 can surround the bundles in the wire. As described earlier, the strands in each bundle rotate through various positions around a central axis over the length of the wire.

One advantage to the construction of the wire 900 is a higher effective cross-section usage of conductors when coiled due to compaction which creates a higher overall Q factor for the transmitter and/or receiver coils. Additionally, in some embodiments, the strands and/or bundles in the transmitter coil and/or in the receiver coil can be coated with a soft magnetic material such as iron, nickel, or cobalt to lower the AC resistance of the wire by reducing proximity effects.

Figure 11:
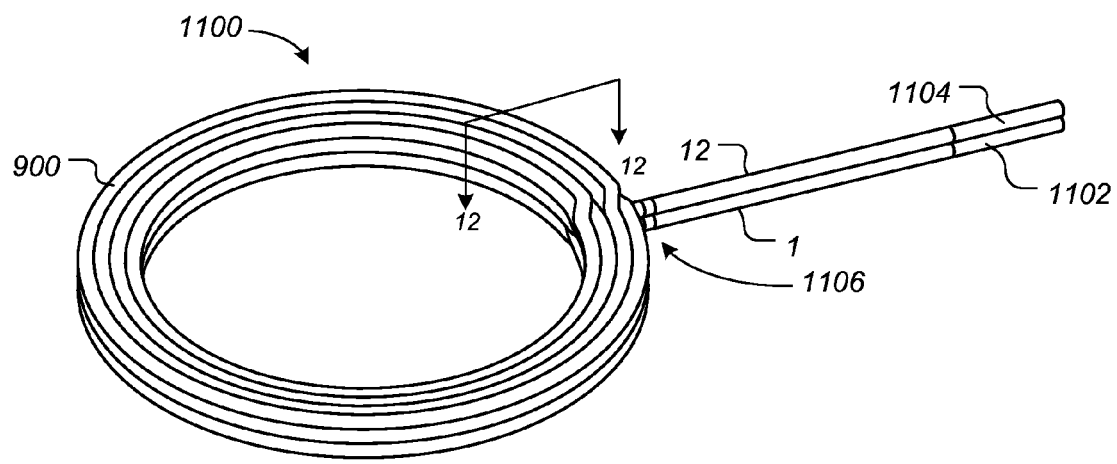
FIG. 11 is a perspective view of one example of a coil suitable for use as the transmitter coil 406 and/or the receiver coil 408 shown in FIG. 4.

Referring now to FIG. 11, there is shown a perspective view of one example of a coil suitable for use as the transmitter coil 406 and/or the receiver coil 408 shown in FIG. 4. The coil 1100 may be formed from a single wire 900. The illustrative coil 1100 includes three rows or layers and four columns of the wire 900 packed into a circular structure. Thus, the coil has twelve windings. Other embodiments can include any number of layers and columns.

The wire 900 is interlaced within the layers such that the input end (e.g., end 1102) and the output end (e.g., end 1104) enter and exit the coil at substantially the same location, or substantially the same side 1106 of the coil. In the illustrated embodiment, the wire is interlaced in two layers and the input end 1102 and the output end 1104 abut one another at the location where the input end enters the coil and the output end exits the coil. Other embodiments can interlace the wire in any number of layers. Additionally, the input and output ends of the wire may enter and exit the coil at substantially the same location, or substantially the same side 1106 of the coil without abutting one another.

Figure 12:
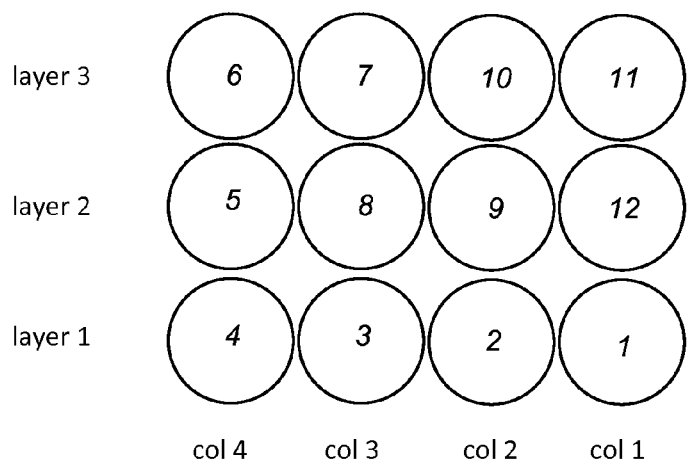
FIG. 12 is a cross-sectional view of the coil 1100 taken along line 12-12 in FIG. 11.

FIG. 12 is a cross-sectional view of the coil 1100 taken along line 12-12 in FIG. 11. Each winding in the coil is numbered one through twelve and illustrates the interlaced pattern or winding configuration of the coil. The windings in layer one are linear across the columns. In other words, windings one through four are sequential across the layer. In layers two and three, the windings begin and end on layer two, move up from the second to the third layer in every other column (e.g., columns 1 and 3), and move down from the third to the second layer in the remaining columns (e.g., columns 2 and 4).

Referring now to FIG. 13, there is shown an expanded view of the inductive transmitter device 102 shown in FIGS. 1 and 2. The receiver coil 302 is included in an enclosure 1300 that surrounds three of the four sides of the coil. The enclosure shapes and directs the magnetic flux produced by the transmitter coil 302 toward the receiver coil. The shape of the transmitter coil is non-rectangular in the illustrated embodiment. As described earlier, at least a portion of the second interface surface 114 of the transmitter device 102 may have a concave shape that follows a selected curve. Thus, the transmitter coil has a trapezoid shape in the embodiment shown in FIG. 13 so that one edge of the coil conforms to the shape of the second interface surface 114.

Figure 14:
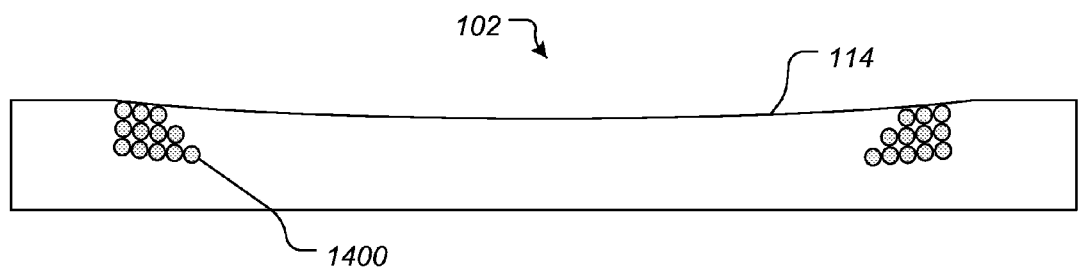
FIGS. 14 and 15 are expanded views of other examples of a transmitter device.
Figure 15:
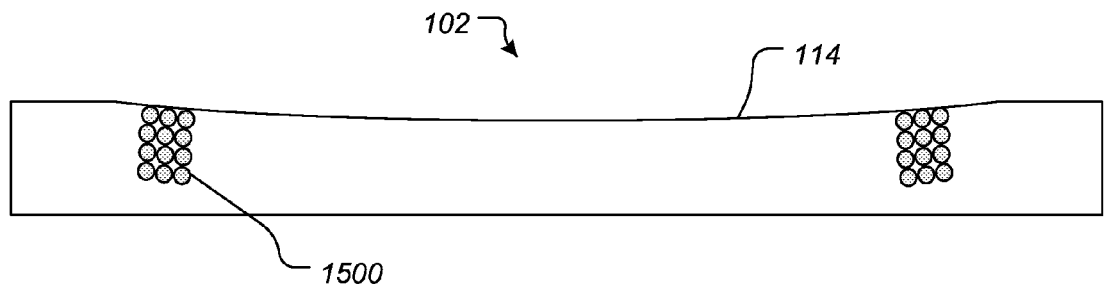

FIGS. 14 and 15 are expanded views of other examples of a transmitter device. In FIG. 14, the transmitter coil 1400 can have three layers, with one layer having 3 columns, the middle layer having four columns, and the last layer having five columns. Like the embodiment shown in FIG. 13, the transmitter coil 1400 can have a shape (or at least one edge of the transmitter coil can have a shape) that is complementary with the second interface surface 114, or the transmitter coil may have a different shape.

In FIG. 15, the transmitter coil 1500 can have four layers, with each layer having 3 columns. Again, the transmitter coil 1500 can have a shape (or at least one edge of the transmitter coil can have a shape) that is complementary with the second interface surface 114, or the transmitter coil may have a different shape.

The second interface surface 114 and/or the transmitter coil can have a different shape in other embodiments. For example, the second interface surface 114 can be substantially flat. In these embodiments, the shape of the transmitter coil may be rectangular. Alternatively, the transmitter coil can have a different shape, such as a helical shape. The shape of the coil can be designed to direct the magnetic flux produced by the coil and/or to reduce the distance between the transmitter and receiver coils.

Although the embodiments of FIGS. 13-15 have been described with reference to a transmitter coil, the illustrate coils may be included in the receiver device. Additionally, the transmitter and/or receiver coil can have a winding configuration that positions the input end (e.g., end 1102) and the output end (e.g., end 1104) at substantially the same location, or substantially the same side 1106 of the coil.

Figure 16:
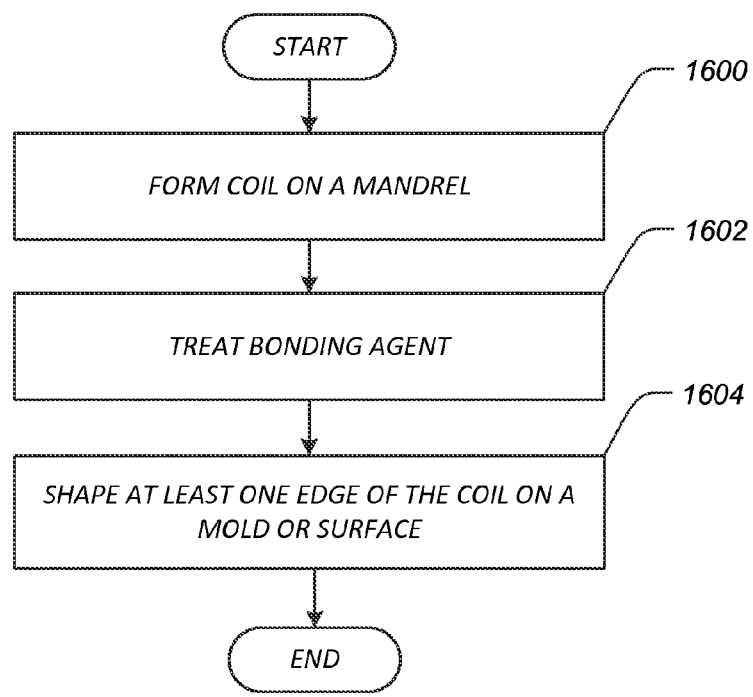
FIG. 16 is a flowchart of a method for forming the inductor coil shown in FIGS. 13-15.

Referring now to FIG. 16, there is shown a flowchart of a method for forming the coil shown in FIGS. 13-15. Initially, an inductor coil is formed on a mandrel by winding the wire on or around the mandrel (block 1600). The inductor coil is formed into a first inductor coil structure. Typically, a bonding agent or adhesive is disposed on the windings to fix or secure the windings in the inductor coil structure.

Next, as shown in block 1602, the bonding agent is treated to cause the bonding agent to become malleable. In some embodiments, the bonding agent can be heated to produce a pliable bonding agent. The inductor coil is then formed into a second inductor coil structure by forming the inductor coil on a mold or surface (block 1604).

For example, an inductor coil can be constructed in a rectangular shape. The bonding agent in the coil can be heated and the inductor coil pressed on a curved surface to produce a trapezoid shape. At least one edge or surface of the coil, the edge in contact with the curved surface, will be formed into a shape that complements the curved surface.

Various embodiments have been described in detail with particular reference to certain features thereof, but it will be understood that variations and modifications can be effected within the spirit and scope of the disclosure. And even though specific embodiments have been described herein, it should be noted that the application is not limited to these embodiments. In particular, any features described with respect to one embodiment may also be used in other embodiments, where compatible. Likewise, the features of the different embodiments may be exchanged, where compatible.

We claim:

1. An inductor coil for use in an inductive energy transfer system, comprising:
    a single wire forming multiple layers and having an input end and an output end;
    the wire defines multiple windings interlaced within at least two of the multiple layers; and
    the input end and the output end of the wire enter and exit the coil on a same side of the coil; wherein
    a top layer of the multiple layers defines a concave profile corresponding to an interface surface of an electronic device housing.

2. The inductor coil as in claim 1, wherein the input end and the output end of the wire abut one another.

3. The inductor coil as in claim 1, wherein the coil comprises three layers and twelve windings.

4. The inductor coil as in claim 1, wherein each layer in the inductor coil has an equal number of columns as the other layers.

5. The inductor coil of claim 1, wherein:
    the input end of the wire enters the coil at a first layer of the coil; and
    the output end of the wire exits the coil from a second layer of the coil adjacent the first layer.

6. The inductor coil of claim 5, wherein:
    the first layer of the coil is a bottom layer; and
    the second layer of the coil is a middle layer.

7. The inductor coil of claim 1, wherein the concave profile follows a curve of the electronic device housing.

8. The inductor coil of claim 1, wherein adjacent columns of the inductor coil are offset from one another in a direction parallel to a column axis to form the top layer that defines the concave profile.

9. An inductor coil for use in an inductive energy transfer system of an electronic device, comprising:
    a single wire forming multiple layers and having an input end and an output end; wherein
    the wire defines multiple windings arranged in an interlace pattern;
    the input end and the output end of the wire enter and exit the coil at substantially one location and abut one another; and
    a shape of an edge of the inductor coil conforms to a curved interface surface of the electronic device.

10. The inductor coil as in claim 9, wherein the coil comprises three layers and twelve windings.

11. The inductor coil as in claim 10, wherein the interlace pattern of windings is:

| 11 | 10 | 7 | 6 |
| 12 | 9  | 8 | 5 |
| 1  | 2  | 3 | 4 | and windings 1 and 12 comprise the input and output ends.

12. The inductor coil as in claim 9, wherein each layer in the inductor coil has an equal number of columns as the other layers.

13. The inductor coil of claim 9, wherein:
    the input end of the wire enters the coil at a bottom layer of the coil;
    the output end of the wire exits the coil from a middle layer of the coil; and
    the edge of the inductor coil is formed by a top layer of the coil.

14. The inductor coil of claim 9, wherein:
    the interface surface of the electronic device is configured to conform to a convex surface of a wearable electronic device; and
    the wearable electronic device comprises a receiving coil proximate the convex surface and configured to inductively couple to the inductor coil.

15. An inductor coil comprising:
    a wire forming multiple interlaced windings dispersed among a plurality of layers, the wire comprising an input end and an output end each having a length, wherein:
    the input end and the output end extend away from the coil at a same side of the coil and abut one another along at least a portion of the lengths of the input end and the output end; and
    adjacent columns of the inductor coil are offset from one another in a direction parallel to a column axis to form a top layer that defines a concave profile.

16. The inductor coil of claim 15, wherein:
    each winding of a first set of the windings starts and ends within a same layer; and
    each winding of a second set of the windings starts and ends in a different layer.

17. The inductor coil of claim 16, wherein:
    the first set of the windings forms at least a portion of a first layer; and
    the second set of the windings forms at least a portion of a second and a third layer.

18. The inductor coil of claim 16, wherein each layer comprises at least four windings.

19. The inductor coil of claim 15, wherein each layer has an equal number of columns as the other layers.

20. The inductor coil of claim 15, wherein:
    the input end of the wire enters a bottom layer of the coil; and
    the output end of the wire exits a middle layer of the coil.

* * * * *

UNITED STATES PATENT AND TRADEMARK OFFICE
CERTIFICATE OF CORRECTION

PATENT NO. : 9,449,754 B2
APPLICATION NO. : 14/291024
DATED : September 20, 2016
INVENTOR(S) : Christopher S. Graham et al.

It is certified that error appears in the above-identified patent and that said Letters Patent is hereby corrected as shown below:

On the Title Page

Item (72) Inventors addresses are changed to read as follows:

Please delete "Cupertino" and insert --San Francisco-- at Christopher S. Graham.

Please delete "Cupertino" and insert --San Jose-- at Eric S. Jol.

Please delete "Cupertino" and insert --Santa Clara-- at Makiko K. Brzezinski.

Please delete "Cupertino" and insert --Mountain View-- at Paul J. Thompson.

Please delete "Cupertino" and insert --San Mateo-- at Stephen E. Yao.

Signed and Sealed this
Sixteenth Day of May, 2017

Michelle K. Lee
*Director of the United States Patent and Trademark Office*